July 29, 1969 C. W. DAVID 3,457,894

APPARATUS FOR COATING A FLAT SURFACE OF A DISC WITH PROTECTIVE MATERIAL

Filed March 29, 1965 2 Sheets-Sheet 1

INVENTOR

CHARLES W. DAVID

BY Samuel Lindenberg

Abraham Wasserman

ATTORNEYS

INVENTOR
CHARLES W. DAVID
BY Samuel Lindenberg
Abraham Wasserman
ATTORNEYS

United States Patent Office 3,457,894
Patented July 29, 1969

3,457,894

APPARATUS FOR COATING A FLAT SURFACE OF A DISC WITH PROTECTIVE MATERIAL

Charles W. David, Los Angeles, Calif., assignor to Data Products Corporation, Culver City, Calif., a corporation of Delaware Filed Mar. 29, 1965, Ser. No. 443,238
Int. Cl. B05c *11/08, 11/12*
U.S. Cl. 118—52 2 Claims

ABSTRACT OF THE DISCLOSURE

A method and apparatus for treating a disc which is coated with magnetic material. While the disc is rotated, a protective coating material, such as wax, is applied to the disc from a source, supported on an assembly which moves from a null position to an advanced position above the disc, to produce a uniform wax coating on the disc. As the assembly moves back to the null position a diluting fluid is deposited on the rotating disc. Thereafter, the disc is rotated at a selected speed and period, to control the final characteristics of the wax coating which remains on the disc surface.

The present invention relates to means finding particular application in the manufacturing of coated discs and, more particularly, to improvements in apparatus for automatically cleaning and waxing magnetic discs.

In the manufacturing of a magnetic disc, a flat highly precisioned disc, generally machined of a high quality metallic alloy, is coated with a magnetic material.

The thickness and uniformity of the coat of magnetic material are precisely controlled so that the material may satisfactorily serve as a medium for storing elements of information.

After coating and prior to testing the material for uniform magnetic properties over the entire coated surface of the disc, it is necessary to carefully clean the coated disc to remove any loose chips which may affect the testing of the magnetic properties. Also, at the end of the manufacturing process, it is advantageous to deposit a very thin and uniform layer of protective material, such as wax, on the magnetic disc. Such material seals any open pores on the disc as well as serving as a lubricant surface to protect the disc in actual use.

Accordingly, it is an object of the present invention to provide a new apparatus for coating a flat surface of a disc-like object.

Another object of the present invention is the provision of a new apparatus for automatically and efficiently treating a magnetic disc during its manufacturing.

Still another object of the present invention is to provide a novel apparatus for automatically coating a flat surface of a disc-like object with a layer of protective material.

These and other objects of the invention are achieved by a method and apparatus, whereby a disc, coated with magnetic material, is rotated about its center and either cleaning or protective material is automatically applied thereto from an overhanging carriage assembly. During the cleaning operation, a rotating brush is lowered onto the surface of the rotating disc, so that any loose particles or chips on the surface are brushed off. Thereafter, the brush is raised, and the rotating disc is automatically rinsed to remove the cleaning material therefrom. After rinsing the disc, the rate of its rotation is greatly increased for a preselected time interval in order to dry the cleaned surface of the magnetic disc for further processing.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figures 1, 2:
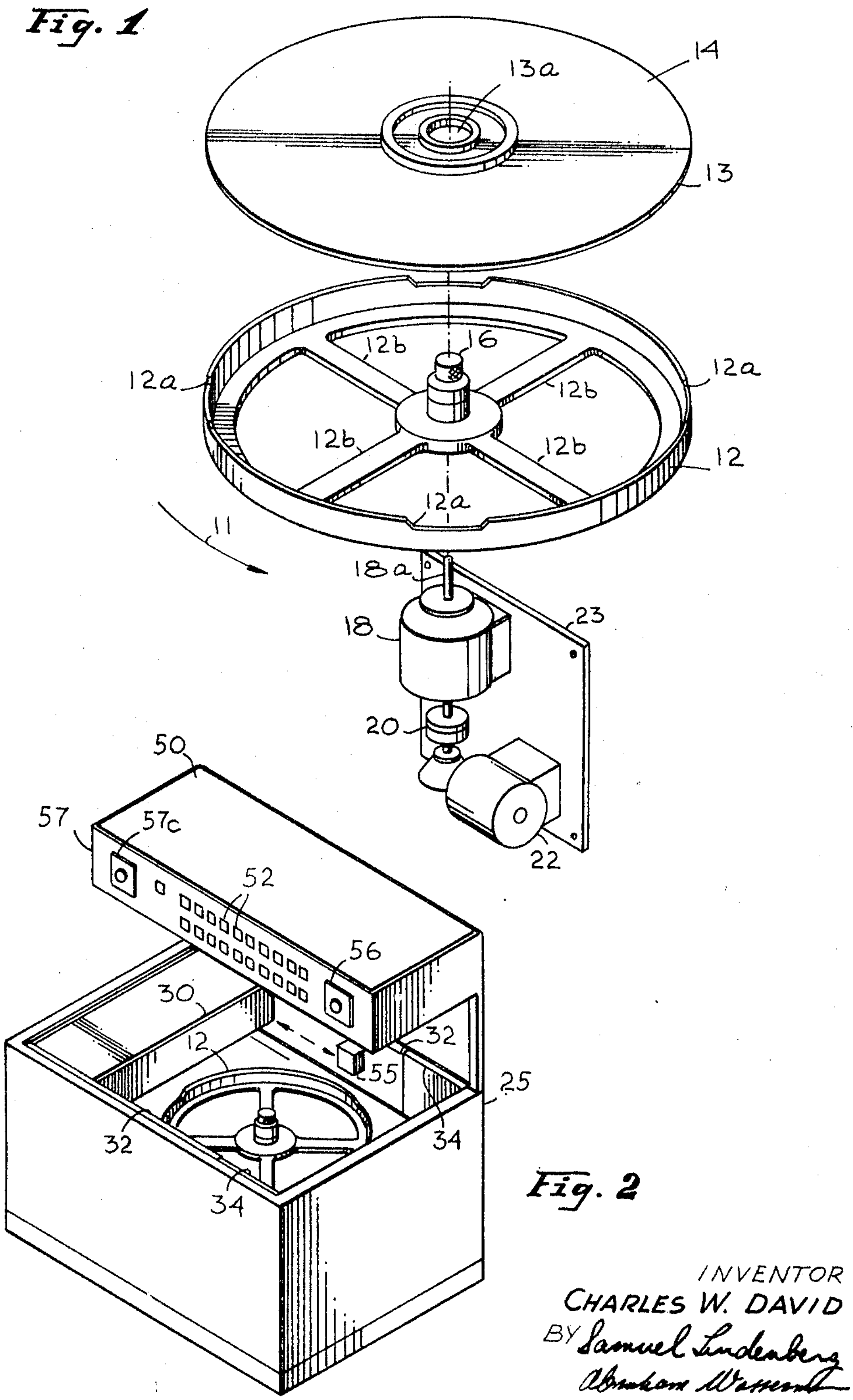
FIGURE 1 is an expanded isometric view of a portion of the apparatus of the present invention.
FIGURE 2 is an isometric view of the novel cleaning and waxing apparatus of the invention.

Reference is now made to FIGURE 1 which is an expanded isometric view of a disc mounting assembly 11 comprising a table 12. A disc 13 having its flat surfaces coated with magnetic material 14 may be conveniently placed on the table by means of hand slots **12*a*, and secured thereon by an expandable collet 16 which grips the disc at an internal aperture 13*a* thereof. The table 12 is coupled to a rotatable shaft 18*a* of a drive motor 18, shaft 18*a* being also coupled through a clutch assembly 20 to an operational motor 22. Rotary motion is provided to the table 12 and disc 13 mounted thereon when either of motors 18 and 22** is energized.

In operation, operational motor 22, by means of clutch assembly 20 and shaft 18, rotates the table 12 at a relatively low speed such as 60 r.p.m. Then at the end of each operational cycle, when the surface of disc 13 is to be dried, clutch assembly 20 and motor 22 are de-energized and motor 18 energized to rotate the disc 13 at a high speed such as 1200 r.p.m.

The disc mounting assembly 11 is mounted by means of a support plate 23 within a housing 25 shown in isometric view in FIGURE 2. The assembly 11 is mounted so that an operator may conveniently be able to place a disc on the table 12 so that the surface thereof be automatically cleaned or waxed.

The apparatus of the invention also includes a carriage assembly 30 supported between side walls 32 which define top flanges which are slidable over rails 34 which form a part of housing 25. The assembly 30 is automatically movable from the position shown in FIGURE 2, which hereafter will be referred to as the null position, to an advanced position so that material contained in the assembly as well as a brush used to clean the magnetic material on the surface of the disc may be directly applied to a disc rotating on table 12.

Figure 3:
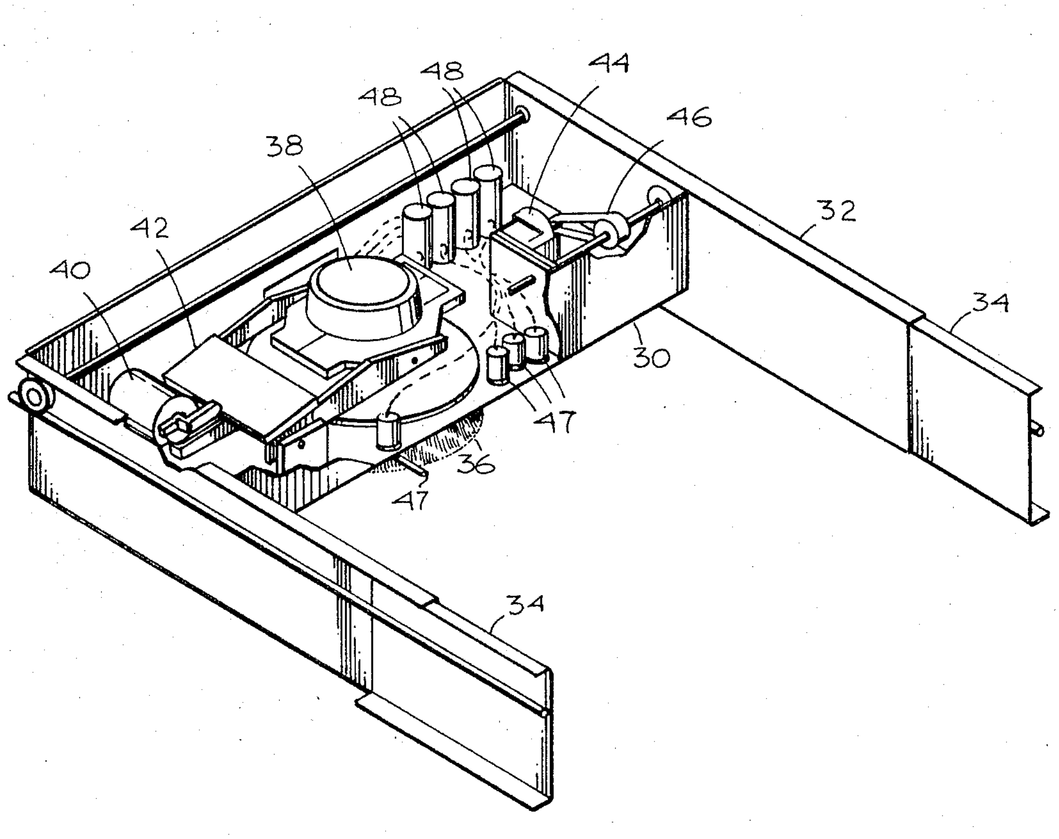
FIGURE 3 is an isometric view of the carriage assembly of the apparatus of the invention.

For a better understanding of the present invention, reference is made to FIGURE 3 which is an isometric view of the carriage assembly 30. Therein is mounted a brush 36 which is rotated about its axis by a brush motor 38. The brush may be lowered (from the position shown) onto the rotating disc by means of a cam motor 40 coupled to the brush through a cam 42. A motor 44 provides power for moving the carriage assembly 30 by means of a belt arrangement 46 between the null and advanced positions. The assembly 30 also includes a plurality of nozzles 47 through which a cleaning liquid, a rinse liquid, water and wax are supplied onto the surface of the rotating disc, from a plurality of containers (not shown), through a plurality of solenoid valves 48.

The apparatus of the invention also includes control circuitry housed in compartment 50 of housing 25, with a plurality of control switches 52 easily accessible on a first control panel 57. An operator, after only a brief training period, may control the cleaning and waxing of a magnetic disc by proper activation of the control switches 52. By pressing properly designated switches both operations may be automatically performed.

Upon actuation of a particular control switch 52, labeled "AUTO CLEAN," the cleaning operation becomes entirely automated. When so actuated, the table 12 on which a disc, such as disc 13, is mounted, starts to rotate. Also motor 44 is energized to advance the carriage assembly 30 from the null position to the advance position. Concurrently, detergent liquid from one of nozzles 47 is deposited on the surface of the rotating disc. When the carriage assembly is completely advanced, which may be sensed by a position sensor 55 (FIGURE 2), cam motor 40 is energized to lower the brush 36 by means of cam 42. Also, motor 38 is energized to rotate the brush on the surface of the rotating disc. Thus, the surface is brushed with the detergent liquid serving as lubricant.

After a time period preset by a timer 56, motor 40 is again energized to raise brush 36, which stops rotating when motor 38 is de-energized. Also the supply of detergent is stopped, and the carriage assembly 30 is automatically returned to the null position by means of motor 44. As the assembly moves back, a rinse liquid is deposited on the surface of the disc in order to rinse the detergent liquid previously deposited thereon.

When the assembly returns to the null position, the supply of rinse liquid is stopped and motors 22 and clutch assembly 20 de-energized. Concurrently, motor 18 is energized in order to rotate the disc at a relative high speed so that the surface of the disc is dried by the removal of all the liquid therefrom. As seen from FIGURE 1, the table 12 has four blades **12*b* which are machined with a selected pitch so that when the table spins at a high rate, air is pushed down to the bottom of housing 25**, to prevent liquid collected thereat from wetting or moistening the rotating disc.

When the apparatus of the present invention is used for waxing the surface of a rotating disc, the series of steps which may be automatically performed is similar to that herebefore described. Namely, the disc is rotated by motor 22 and assembly 30 is moved to the advanced position by motor 44. But instead of detergent liquid, a wax having selected properties is deposited on the surface of the rotating disc. When the assembly is completely advanced, the supply of wax is stopped and a rinse or diluting liquid is deposited on the disc for a preset time period. The supply of wax and diluting liquid may be repeated to further control the thickness and the viscosity properties of the wax which finally remains on the magnetic material coated on the surface of the disc.

Thereafter, the assembly is automatically returned to the null position, turning off the supply of the diluting liquid. Then, clutch assembly 20 is de-energized and motor 18 energized for a set time period controlled by timer **57*c* to turn or spin the disc at a relatively high rate so that only a coat of wax of predetermined thickness and viscosity remains on the magnetic material on the surface of the disc. Thus by controlling the amount of wax applied to the disc from the assembly 30** moving above the disc at a preselected rate and by controlling the amount of diluting liquid and the time during which the disc is dried, the characteristics of the layer of wax can be controlled. For example, in one application, the thickness of a layer of wax over a surface of approximately 700 square inches was controlled to be within a few millionths of an inch.

There has accordingly been described and shown a novel method and means for automatically cleaning and waxing a coated surface of a disc.

What is claimed is:

1. An apparatus for automatically coating a flat surface of a member with a layer of protective material of predetermined thickness and viscosity characteristics comprising a structure including means for fastening thereto a disc having a flat surface; first electrical means coupled to said structure for rotating said structure and the disc coupled thereto about a center of said disc at a first rate; a movable assembly including sources of a protective material and a diluting fluid; means for moving said assembly between a null position and an advanced position above the flat surface of said rotating disc, means for depositing protective material onto the flat surface of said rotating disc as said assembly moves from said null position to the advanced position; means for depositing diluting fluid onto the flat surface of said rotating disc as said assembly moves from said advanced position to said null position to control the viscosity characteristics of the protective material deposited on said disc; and second electrical means clutchably coupled to said first electrical means for rotating for a preset time said disc at a second rate substantially greater than said first rate to centrifugally control the thickness of the layer of protective material deposited onto the flat surface of said disc to produce a uniform coating of protective material thereon.

2. An apparatus for automatically coating a flat surface of a circular disc with a layer of protective material of predetermined thickness and viscosity characteristics comprising a structure including means for fastening thereto a circular disc having a flat surface; first electrical means coupled to said structure for rotating said structure and the disc coupled thereto about a center of said disc at a first rate; a movable assembly including sources of a protective material and water; means for moving said assembly between a null position and an advanced position above the flat surface of said rotating disc; means for depositing protective material onto the flat surface of said rotating disc as said assembly moves from said null position to the advanced position; means for depositing water onto the flat surface of said rotating disc as said assembly moves from said advanced position to said null position to control the viscosity characteristics of the protective material deposited on said disc; and second electrical means clutchably coupled to said first electrical means for rotating for a preset time said disc at a second rate substantially greater than said first rate to centrifugally control the thickness of the layer of protective material deposited onto the flat surface of said disc to produce a uniform coating of protective material thereon.

References Cited

UNITED STATES PATENTS

| | | | |
|---|---|---|---|
| 2,100,920 | 11/1937 | Rogers | 118—52 X |
| 2,387,349 | 10/1945 | Powers | 118—52 X |
| 2,787,560 | 4/1957 | Shaw | 118—52 X |
| 3,136,659 | 6/1964 | Walker et al. | 118—503 |
| 3,280,792 | 10/1966 | Heyde | 118—52 |
| 3,352,280 | 11/1967 | Hughes et al. | 118—52 X |

DANIEL BLUM, Primary Examiner

U.S. Cl. X.R.

15—77; 233—24, 45